Oct. 30, 1956 R. F. PIGG 2,768,921
METHOD OF MOLDING TAPERED RODS
Filed May 20, 1954
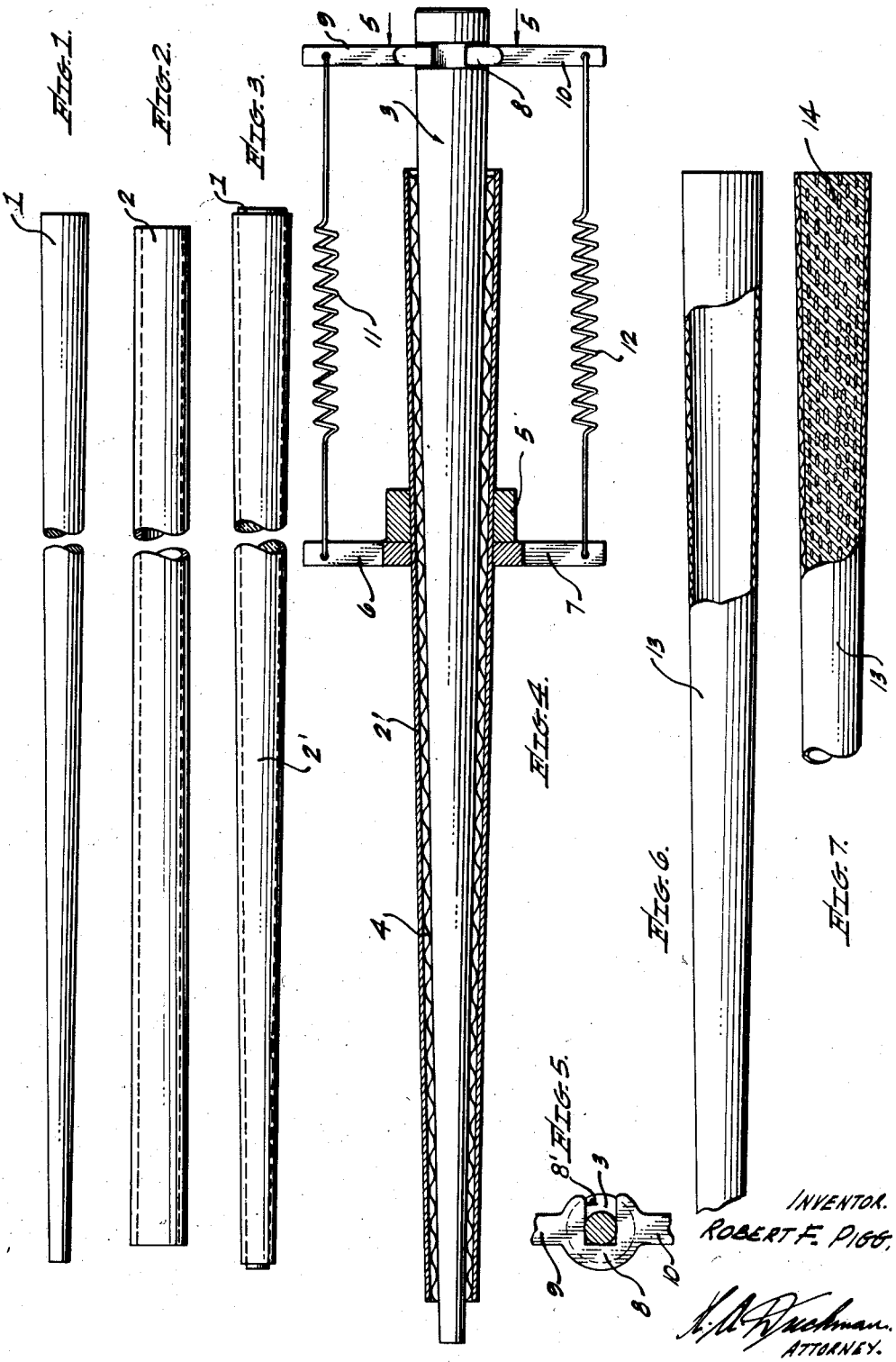
INVENTOR.
ROBERT F. PIGG.
ATTORNEY.

United States Patent Office 2,768,921
Patented Oct. 30, 1956

2,768,921
METHOD OF MOLDING TAPERED RODS
Robert F. Pigg, Bell, Calif.
Application May 20, 1954, Serial No. 431,071
4 Claims. (Cl. 154—91)

This invention relates to a method of making tubular rods or shafts, such as fishing rods, arrows, golf shafts, ski poles and the like, and particularly rods or shafts which are tapered.

An object of my invention is to provide a novel method of molding a rod or shaft in which the rod or shaft is accurately tapered from one end to the other, and wherein the wall thickness is accurately maintained if the rod or shaft is tubular.

Another object of my invention is to provide a novel method of molding a rod or shaft in which the rods or shafts can be quickly and accurately formed, and in which the surface of the rod or shaft is finished and smooth.

Still another object of my invention is to provide a novel method of forming a rod or shaft which is tapered from one end to the other, and in which the rods or shafts can be quickly and accurately formed with a minimum amount of labor, and where the rods or shafts are always accurate and commercially acceptable.

Other objects, advantages and features of invention may appear from the accompanying drawing, the subjoined detailed description and the appended claims.

In the drawing:

Figure 1 is a side elevation of a mandrel.

Figure 2 is a side elevation of a metal tube.

Figure 3 is a side elevation of the metal tube swaged or formed over the mandrel.

Figure 4 is a longitudinal sectional view of the mold in which the rod or shaft is formed.

Figure 5 is a fragmentary sectional view taken on line 5—5 of Figure 4.

Figure 6 is a side elevation with parts broken away of a rod or shaft after it has been molded.

Figure 7 is a fragmentary side elevation with parts broken away of a slightly modified form of rod or shaft formed according to my method.

Referring more particularly to the drawing, my method of forming a tubular rod or shaft, such as a fishing rod, an arrow, a golf shaft, ski pole, etc., consists of the following: A mandrel 1 is first machined from a metal rod and this mandrel is tapered accurately from one end to the other, according to the required external taper of the completed rod or shaft. A metal tube 2, is now selected from a proper metal such as aluminum, bronze and certain steels, so that this tube may be rolled, swaged, spun or drawn without decreasing the strength of the metal. The tube 2 is now placed over the mandrel 1 and, by the usual and well known process of rolling, or spinning, or swaging or drawing, the tube is caused to accurately conform to the taper of the mandrel as shown at 2'. The inside surface of the tube 2' is now tapered from end to end in exact conformity with the mandrel 1. The mandrel 1 is now withdrawn from the tube 2'. A steel core 3 is formed of metal and is tapered from one end to the other, and the outside diameter of the core 3 is smaller than the inside diameter of the tube 2', an amount corresponding to the wall thickness of the completed rod or shaft. The core 3 is now wrapped with a woven fiber cloth 4, such as glass cloth, cotton or the like, and this cloth is then saturated with a thermo-setting plastic type, such as phenol-furfural resins, phenolic resins or urea resins, and also cellulose acetates, cellulose nitrates and others. The core 3, with the saturated fiber cloth wrapped thereon, is now inserted into the tube 2' and this tube acts as a mold for the saturated fiber cloth.

Longitudinal pressure is applied to the core 3 while it is within the tube 2 in the folowing manner: A collar 5 is fixedly attached to the outside of the tube 2', or may be integrally formed thereon, if desired. A pair of radial arms 6—7 project outwardly from the collar 5. A fitting 8 as shown in Fig. 5, is mounted on the outer end of the core 3, and is preferably detachable so that the core may be more easily handled while the cloth is wrapped thereon, and while the cloth is being saturated with the plastic. The fitting 8 includes arms 9—10 projecting therefrom, and a slotted central part 8' which fits in a reduced neck portion of the core 3. A spring 11 extends between the arms 6 and 9, and a similar spring 12 extends between the arms 7 and 10. Thus it will be evident that the core 3 will be yieldably pressed into the tube 2 by the springs 11 and 12 and will thus maintain a constant pressure against the cloth wrapping on the core due to the parallel tapered surfaces of the tube 2 and core 3. The entire assembly thus far described is now placed in a suitable oven and is heated to a temperature of 280° to 350° Fahrenheit, or whatever the required curing temperature of the plastic might be. After the curing cycle is completed the assembly is cooled.

The core 3 is now pulled out of the tube 2' and the completed rod or shaft 13 is then pulled off of the core 3. The rod or shaft 13 will have a uniform wall thickness from end to end and will also be accurately tapered from one end to the other. Due to the fact that the inside surface of the tube 2 and also the outside surface of the core 3 are finished and, therefore, smooth, the outer and inner surfaces of the rod or shaft 13 will also be smooth and finished. If it is desired to add compressive strength to the rod or shaft 13, I may fill the rod or shaft after it is molded with a foam plastic, shown at 14. This foam plastic may be an iso-cyanate or a foam phenolic resin. These foam plastics can be poured into the rod or shaft 13 and, when set, will be porous and, therefore, light and will add an appreciable amount of compressive strength to the rod or shaft.

Having described my invention, I claim:

1. The method of forming a tapered rod, which consists in forming a tube of uniform taper from end to end on the inside surface thereof, a core of uniform taper from end to end on the outside surface thereof, said core being of lesser outside diameter than the inside diameter of the tube, then wrapping a woven fiber cloth on the outside of the core, then saturating the fiber cloth with a plastic, and then inserting the core with the cloth wrapped thereon within said tube, and then heating the cloth to the required curing temperature of the plastic with which said cloth is saturated, while pressing the cloth against the inside surface of the tube by urging the core into the tube.

2. The method of forming a tapered rod, which consists in forming a tube of uniform taper from end to end on the inside surface thereof, a core of uniform taper from end to end on the outside surface thereof, said core being of lesser outside diameter than the inside diameter of the tube, then wrapping a woven fiber cloth on the outside of the core, then saturating the fiber cloth with a plastic, and then inserting the core with the cloth wrapped thereon within said tube, and then heating the cloth to the required curing temperature of the plastic with which said cloth is saturated, and maintaining a constant longitudinal pressure on the core while the heat is maintained on the plastic saturated cloth, to press the cloth against the inside surface of the tube.

3. The method of molding a tapered rod, which consists in first forming a tube with a uniform taper on the inside thereof from end to end, then forming a core of uniform outside taper from end to end thereof, the outside diameter of the core being less than the inside diameter of the tube by an amount corresponding to the wall thickness of the completed tapered rod, then wrapping the core with a woven glass fiber cloth, then saturating the cloth with a plastic of the thermo-setting type and then heating the tube, core, and the plastic saturated cloth to the required curing temperature of the plastic while pressing the cloth against the inside surface of the tube by urging the core into the tube, then withdrawing the core from the tube and removing the tapered rod from the core.

4. The method of molding a tapered rod, which consists in first forming a tube with a uniform taper on the inside thereof from end to end, then forming a core of uniform outside taper from end to end thereof, the outside diameter of the core being less than the inside diameter of the tube by an amount corresponding to the wall thickness of the completed tapered rod, then wrapping the core with a woven glass fiber cloth, then saturating the cloth with a plastic of the thermo-setting type and then heating the tube, core, and the plastic saturated cloth to the required curing temperature of the plastic, then exerting a spring tension longitudinally against the core while said heating occurs to press the cloth against the inside surface of the tube, then withdrawing the core from the tube and removing the tapered rod from the core.

References Cited in the file of this patent
UNITED STATES PATENTS

| | | |
|---|---|---|
| 1,284,363 | Kempton | Nov. 12, 1918 |
| 2,390,171 | Ratay | Dec. 4, 1945 |
| 2,643,700 | Havens | June 30, 1953 |
| 2,648,388 | Haines et al. | Aug. 11, 1953 |
| 2,694,661 | Meyer | Nov. 16, 1954 |
| 2,710,026 | Stewart et al. | June 7, 1955 |